(12) United States Patent
Kozlowski et al.

(10) Patent No.: US 8,449,399 B2
(45) Date of Patent: May 28, 2013

(54) JOINT ASSEMBLY WITH CENTERING FLANGE

(75) Inventors: Keith A. Kozlowski, Saginaw, MI (US); Sergio Molinar, Cd. Juarez (MX)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

(21) Appl. No.: 13/421,849

(22) Filed: Mar. 15, 2012

(65) Prior Publication Data

US 2012/0237290 A1 Sep. 20, 2012

Related U.S. Application Data

(63) Continuation of application No. 12/491,931, filed on Jun. 25, 2009, now abandoned, which is a continuation of application No. 11/355,365, filed on Feb. 16, 2006, now abandoned.

(60) Provisional application No. 60/654,323, filed on Feb. 18, 2005.

(51) Int. Cl.
*F16D 3/223* (2006.01)

(52) U.S. Cl.
USPC ............................ 464/146; 464/906; 403/335

(58) Field of Classification Search
USPC .................... 464/134, 146, 182, 906; 403/13, 403/14, 262, 335, 337
See application file for complete search history.

(56) References Cited

U.S. PATENT DOCUMENTS

| | | | |
|---|---|---|---|
| 1,362,633 A | | 12/1920 | McCutcheon |
| 1,940,886 A | * | 12/1933 | Rosenberg ................ 403/337 X |
| 2,653,834 A | * | 9/1953 | Purkhiser .................. 403/337 X |
| 3,464,232 A | * | 9/1969 | Hutchinson .................... 464/146 |

(Continued)

FOREIGN PATENT DOCUMENTS

| | | |
|---|---|---|
| DE | 636367 | 10/1936 |
| DE | 3836764 | 6/1989 |

(Continued)

OTHER PUBLICATIONS

International Search Report and Written Opinion mailed from the European Patent Office on Jun. 12, 2006 for International Pat. App. Ser. No. PCT/US2006/005607.

(Continued)

*Primary Examiner* — Gregory Binda
*Assistant Examiner* — Josh Skroupa
(74) *Attorney, Agent, or Firm* — Cantor Colburn LLP

(57) ABSTRACT

A joint assembly for coupling a first rotating part and a second rotating part includes a first rotating part comprising a first mounting flange having a first shoulder and a first axis and a second rotating part comprising a second mounting flange having a second shoulder and a second axis, the first flange and the second flange configured to secure the joint assembly. It also includes a cylindrical inner surface disposed in the second shoulder. It further includes a centering flange disposed on the first shoulder, the centering flange having a first length and disposed about the first axis; the centering flange having an axially extending non-contact section and an axially coextending contact section that is disposed within and extends radially outwardly from the noncontact section, the contact section having an annular convexly curved outer surface disposed about the first axis and a second length substantially smaller than the first length.

20 Claims, 6 Drawing Sheets

U.S. PATENT DOCUMENTS

| | | | |
|---|---|---|---|
| 3,500,658 A | 3/1970 | Goody | |
| 3,713,676 A * | 1/1973 | Carlstrom et al. | 403/337 X |
| 4,070,120 A | 1/1978 | Bald et al. | |
| 4,640,641 A | 2/1987 | Edelmayer | |
| 4,936,004 A | 6/1990 | Vaughn | |
| 5,366,286 A | 11/1994 | Ruttimann | |
| 5,749,786 A | 5/1998 | Pattok | |
| 6,139,216 A | 10/2000 | Bertetti | |
| 6,273,825 B1 | 8/2001 | Schwarzler et al. | |
| 6,406,034 B1 | 6/2002 | Alcantara et al. | |
| 6,648,540 B2 | 11/2003 | Brisson et al. | |
| 6,663,494 B2 | 12/2003 | Curi | |
| 6,769,720 B2 | 8/2004 | Dahms et al. | |
| 6,971,958 B2 | 12/2005 | Uchman et al. | |
| 7,008,327 B2 | 3/2006 | Kuczera et al. | |
| 7,074,129 B2 | 7/2006 | Sugiyama et al. | |
| 7,094,155 B2 | 8/2006 | Hosoya et al. | |
| 7,232,374 B2 | 6/2007 | Tajima et al. | |
| 2002/0077186 A1 | 6/2002 | Hosoya et al. | |
| 2002/0090885 A1 | 7/2002 | Wendt | |
| 2003/0127908 A1 | 7/2003 | Lyon et al. | |
| 2005/0277480 A1 | 12/2005 | Breese | |
| 2006/0140713 A1 | 6/2006 | Kobayashi | |
| 2007/0248403 A1 | 10/2007 | Rehr et al. | |

FOREIGN PATENT DOCUMENTS

| | | | |
|---|---|---|---|
| DE | 19647063 | | 5/1998 |
| DE | 10350845 | B3 | 4/2005 |
| EP | 0671568 | | 9/1995 |
| JP | 02150509 | | 6/1990 |
| JP | 10196669 | | 7/1998 |
| JP | 2000191143 | | 7/2000 |
| JP | 2000191143 | A * | 7/2000 |
| JP | 2002206561 | | 7/2002 |
| WO | 2006089102 | | 8/2006 |

OTHER PUBLICATIONS

Mott, Robert L. Machine Elements in Mechanical Design. Prentice-Hall, 1998. 3rd edition, p. 516.

* cited by examiner

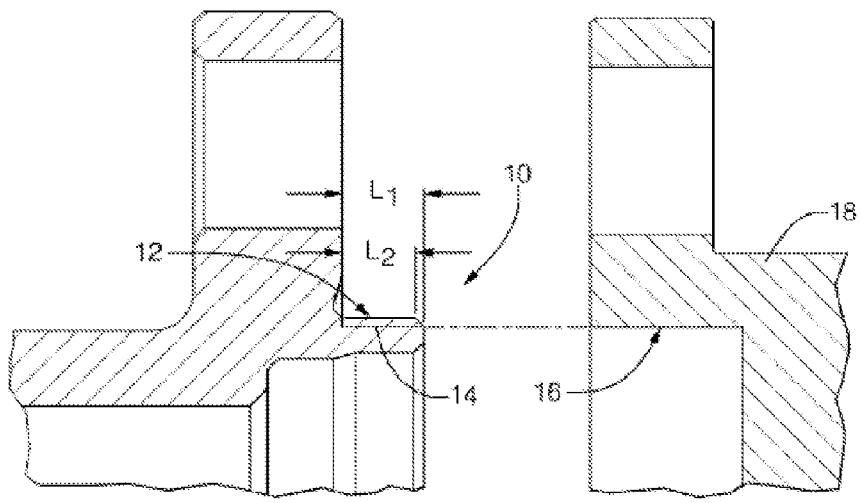
FIG. 1
PRIOR ART
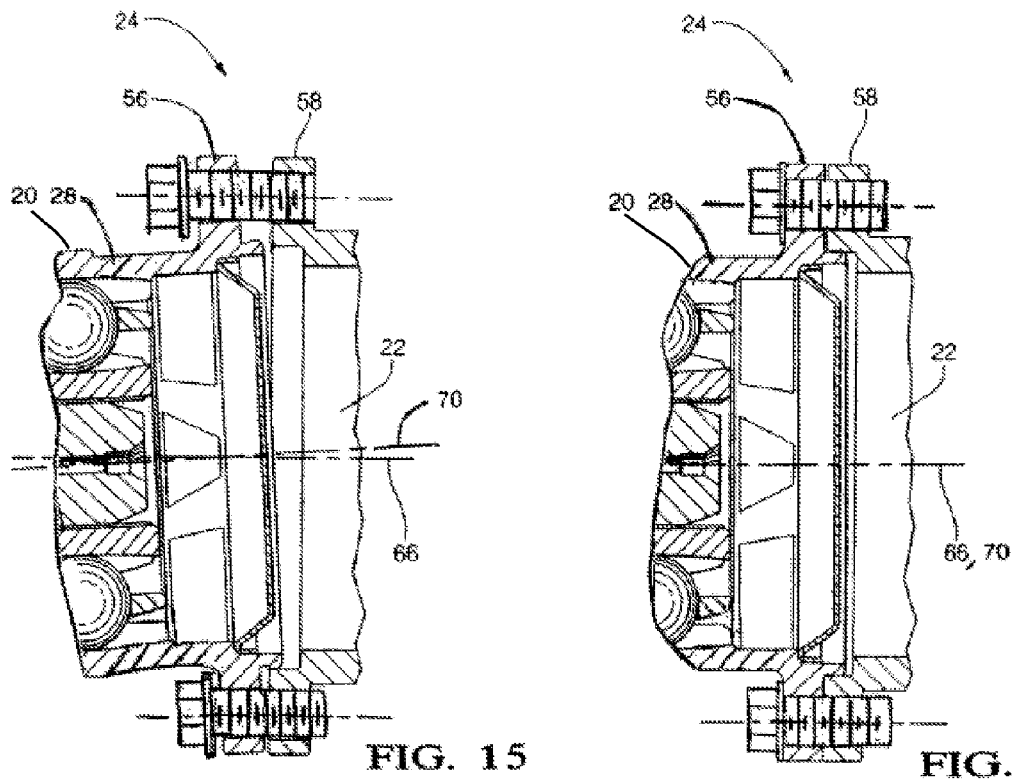
FIG. 15　　　FIG. 16

JOINT ASSEMBLY WITH CENTERING FLANGE

CROSS REFERENCE TO RELATED APPLICATIONS

This application is a continuation application of U.S. patent application Ser. No. 12/491,931, filed Jun. 25, 2009, which is a Continuation of U.S. patent application Ser. No. 11/355,365 filed Feb. 16, 2006 (now abandoned), which is a Nonprovisional of U.S. Provisional Application No. 60/654,323 filed Feb. 18, 2005, the entire contents of which are incorporated herein by reference.

BACKGROUND OF THE INVENTION

The present invention relates generally to joint assemblies for operatively coupling rotating parts. More specifically, the present invention relates to joint assemblies comprising multiple joint members with one of the joint members having a centering flange for mounting to one of the rotating parts.

Joint assemblies for operatively coupling first and second rotating parts are well known in the art. One particularly well known joint assembly is that formed between one end of what is referred to as a constant velocity or CV joint that is included in the first rotating part, and the second rotating part. A typical CV joint of a first rotating part comprises a first CV joint member and a second CV joint member, the second CV joint member having an end adapted for mounting to a second rotating part as part of a joint assembly. A plurality of torque-transmitting elements, usually in the form of torque-transmitting balls, are disposed between the first and second CV joint members to operatively couple the first and second CV joint members. The first CV joint member can be fixed to other portions of the first rotating part in any number of fashions, such as by splined fits and the like. The second CV joint member often includes a centering flange for mating with the second rotating part.

Referring to FIG. 1, one such centering flange 10 is shown. Here, the centering flange 10 of second CV joint member 12 of the first rotating part has an overall length $L_1$. The centering flange 10 also has a contact section 14 configured for being in a substantially interference fit with an inner cylindrical surface 16 of the second rotating part 18. The contact section 14 has a second length $L_2$ that extends a substantial portion of the overall length $L_1$. Since the contact section 14 of second CV joint member 12 is in a substantially interference fit with the inner cylindrical surface 16 of the second rotating part 18, the volume of material in the contact section 14 must be displaced when mounting the centering flange 10 of second CV joint member 12 to the second rotating part 18, either by forces deflecting the centering flange 10 radially inwardly or by forces deforming the centering flange 10. The larger the volume of material to be displaced, the larger the force required to mount the centering flange 10 to the second rotating part 18, and likewise, the larger the force required to remove the centering flange 10 from the second rotating part 18 to repair or replace the joint assembly. Furthermore, this prior art centering flange, which is cylindrical so as to present a straight pilot, requires a precision fit and is susceptible to binding.

Therefore, there is a need in the art for a centering flange that has a contact section configured in a way such that the substantially interference fit between the centering flange and the second rotating part provides alignment between the centering flange and the second rotating part while minimizing the forces necessary to mount the centering flange to the second rotating part.

SUMMARY OF THE INVENTION

These and other advantages and features will become more apparent from the following description taken in conjunction with the drawings In one embodiment, a joint assembly for coupling first and second rotating parts is disclosed. The assembly includes a first rotating part comprising a first mounting flange having a first shoulder, the first rotating part rotatable about a first longitudinal axis. The assembly also includes a second rotating part comprising a second mounting flange having a second shoulder, the second rotating part rotatable about a second longitudinal axis, the first flange and the second flange configured to secure the joint assembly with the first shoulder proximate the second shoulder. The assembly further includes a cylindrical inner surface disposed in the second shoulder and disposed about the second axis. Yet further, the assembly includes a centering flange disposed on the first shoulder, the centering flange having a first length and disposed about the first axis; the centering flange having an axially extending non-contact section and an axially coextending contact section that is disposed within and extends radially outwardly from the non-contact section, the contact section having an annular convexly curved outer surface disposed about the first axis and a second length substantially smaller than the first length, the contact section configured to provide a substantially interference fit within the inner surface and axial alignment of the first axis and the second axis.

In another embodiment, a joint assembly for coupling first and second rotating parts is disclosed. The assembly includes a first mounting flange having a first shoulder and a centering flange disposed about a first longitudinal axis, the centering flange having a first length and a contact section extending radially outwardly relative to the first axis having an annular convexly curved outer surface disposed about the first axis and a second length substantially smaller than the first length. The assembly also includes a second mounting flange having a second shoulder and a second longitudinal axis and a cylindrical inner surface disposed within the second shoulder about the second longitudinal axis, the cylindrical inner surface defining a void in which the centering flange is received; the first flange and the second flange securing the joint assembly with the first shoulder disposed opposite the second shoulder. The joint assembly has a first state in which the contact section of the centering flange and the inner surface are engaged and the first and second axes are misaligned. The joint assembly also has a second state in which the contact section of the centering flange and the inner surface are engaged and the first and second axes are substantially aligned, an interference fit existing when said joint assembly is in the first state and the second state, wherein a transition between the first state and second state is substantially devoid of binding between the first and second rotating parts.

The contact section has a second length substantially smaller than the first length of the centering flange such that the substantially interference fit between the centering flange and the second rotating part provides alignment between the centering flange and the second rotating part while minimizing forces necessary to mount the centering flange to the second rotating part.

By making the length of the contact section substantially smaller than the overall length of the centering flange, the substantially interference fit requires displacement of less material than the prior art centering flange shown in FIG. 1 with the same outer dimensions. As a result, tolerances between the centering flange and the second rotating part can be increased. In other words, variations in dimensions of the centering flange of the present invention can be higher than the prior art centering flange since the contact section of the centering flange of the present invention is much smaller than that of the prior art centering flange.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

FIG. 1 is a partial, cross-sectional, exploded view of a prior art joint assembly, showing its centering flange;

FIGS. 15 and 16 are enlarged, partial, cross-sectional views of the joint assembly of FIG. 2 showing it in different states of assembly.

DETAILED DESCRIPTION

Referring now to the Figures, where the invention will be described with reference to specific embodiments, without limiting same.

Referring to the Figures, wherein like numerals indicate like or corresponding parts throughout the several views, a joint assembly for coupling first 20 and second 22 rotating parts is shown generally at 24. In one embodiment, the first rotating part 20 is described as including a constant velocity or CV joint. However, the joint assembly 24 may be any joint assembly capable of operatively coupling parts for rotation, while allowing the parts to deviate from perfect axial alignment with one another.

Figure 2:
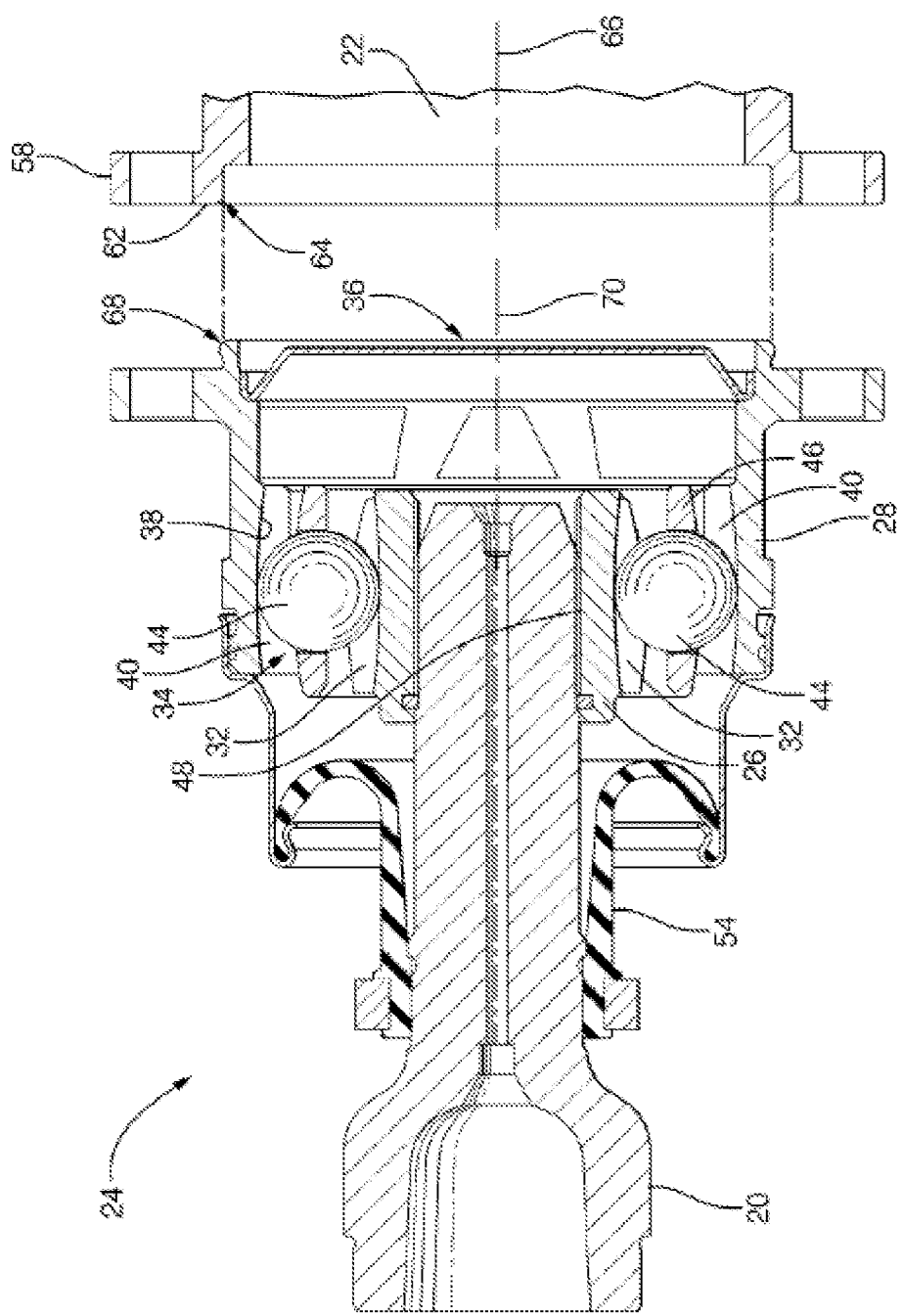
FIG. 2 is a cross-sectional, exploded view of a joint assembly of the present invention, showing its centering flange on a CV joint member.
Figure 3:
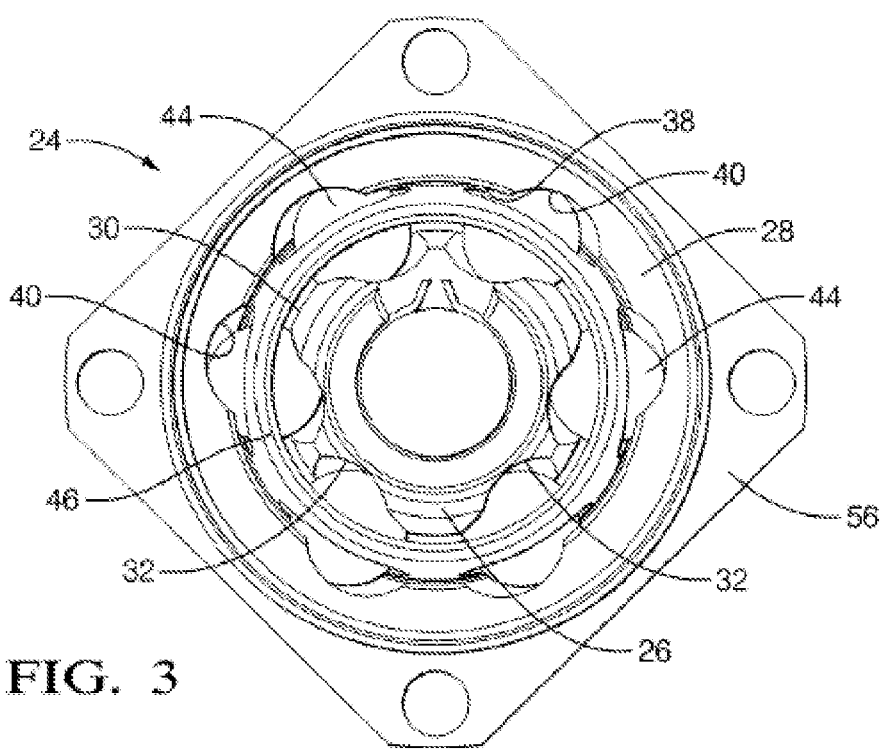
FIG. 3 is an end view of the portion of the joint assembly of FIG. 2 that includes the CV joint of the first rotating part, with the cover enclosing the CV joint closed end removed.

Referring to FIGS. 2-3, the first rotating part 20 includes a CV joint having a first CV joint member 26, known as an inner race in some embodiments and a second CV joint member 28, known as an outer race in some embodiments, that is mounted to the second rotating part 22, thereby forming joint assembly 24. As is typical of known CV joints, the first CV joint member 26 is formed with an outer curved surface 30 (see FIG. 3) in which a plurality of first ball grooves 32 are formed. The second CV joint member 28 has an open end 34 in which the first CV joint member 26 is disposed, an opposite end 36 closed by a cover, and an inner curved surface 38 in which a plurality of second ball grooves 40 are formed.

As is also typical of known CV joints, at least one torque-transmitting element 44 is disposed between the first 26 and second 28 CV joint members to operatively couple the first 26 and second 28 CV joint members. The at least one torque-transmitting element 44 is further defined as a plurality of torque-transmitting balls 44 arranged in pairs of the first 32 and second 40 ball grooves between the first 26 and second 28 CV joint members. A cage 46 contains and secures the plurality of balls 44 between the first 26 and second 28 CV joint members. The balls 44 transmit torque between the CV joint members 26, 28. The first 26 and second 28 CV joint members, the cage 46, and the balls 44 may be formed of any material capable of transferring torque between the first 20 and second 22 rotating parts including ferrous and non-ferrous metals, and the like.

Preferably, the first CV joint member 26 includes an opening 48 with splines for fitting onto mating splines of a stub shaft of the first rotating part 20. It should be appreciated by those skilled in the art that the stub shaft of the first rotating part 20 may, for example, form part of a drive shaft, with the joint assembly 24 being utilized to transmit rotational energy, e.g., torque, from the drive shaft to the second rotating part 22 wherein the second rotating part 22 may be an output shaft for extending to a transfer case, an input shaft of a differential, or the like.

A boot 54 is mounted onto the second CV joint member 28 and is arranged to be fitted onto the stub shaft of the first rotating part 20 to retain lubrication within the CV joint. The boot 54 may comprise any suitable material that is sufficiently flexible to allow the CV joint to operate through a wide range of angles, such as thermoplastic and elastomeric materials.

Figure 4:
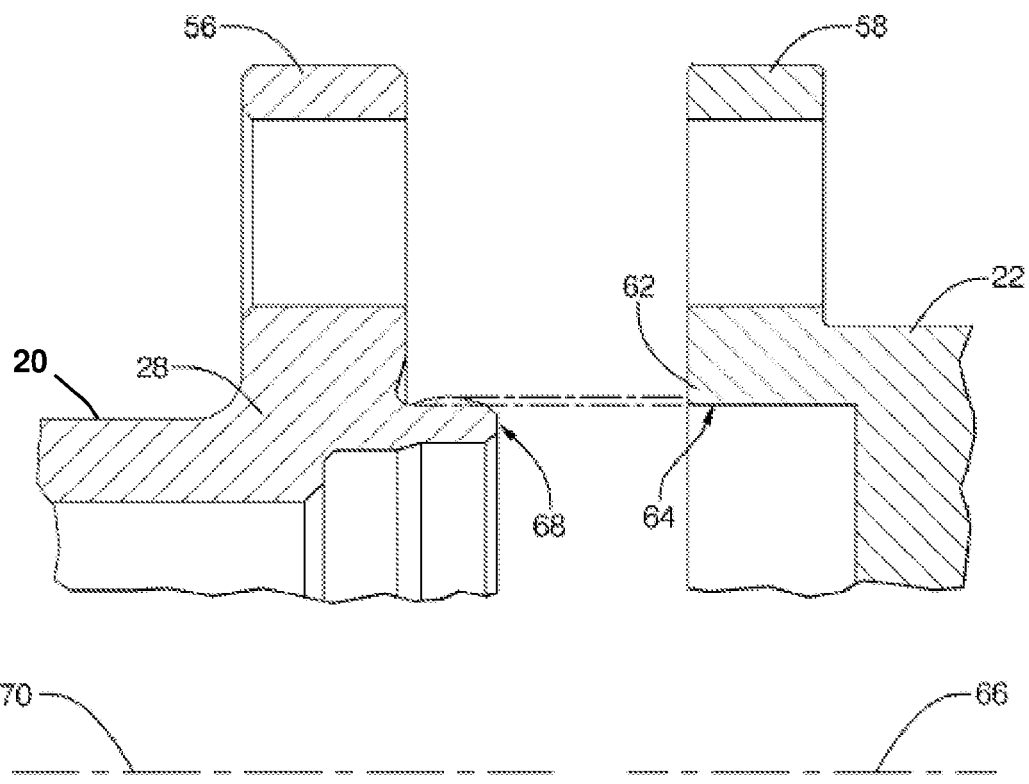
FIGS. 4 and 5 respectively show a partial, cross-sectional, exploded view of the joint assembly having a first centering flange embodiment of the present invention, and an enlarged, partial, cross-sectional view of the first centering flange embodiment.

Referring to FIGS. 4, 15 and 16, the second CV joint member 28 of first rotating part 20 is formed with a radial mounting flange 56 adjacent the closed end 36. The radial mounting flange 56 is adapted to be bolted to a mating flange 58 of the second rotating part 22 in securing joint assembly 24 together. The mating flange 58 has a shoulder 62 with a cylindrical inner surface 64 of predetermined diameter centered about a second axis 66 of the second rotating part 22. Inner surface 64 defines a void in second rotating part 22.

The second CV joint member 28 of first rotating part 20 further includes an annular pilot projection or centering flange 68 disposed about an axis 70 of the second CV joint member 28 and extending axially toward the second rotating part 22. The centering flange 68 is received in the void defined by, and is dimensioned for a substantially interference fit with the cylindrical inner surface 64 in order to center the second CV joint member 28 of the first rotating part 20 on the second rotating part 22 during mounting with radial mounting flange 56 of the second CV joint member 28 and mating flange 58 of the second rotating part 22 positioned to be bolted together in securing joint assembly 24 together, after which axes 66, 70 are aligned. It should be appreciated that the substantially interference fit refers to the overall fit between the centering flange 68 and the cylindrical inner surface 64 while also including imperfections in the shapes of the centering flange 68 and the cylindrical inner surface 64 that may result in portions not being in an interference fit with one another. The centering flange 68 is preferably fixed to the second CV joint member 28 of first rotating part 20, and more preferably is integrally formed with the second CV joint member 28.

Figure 5:
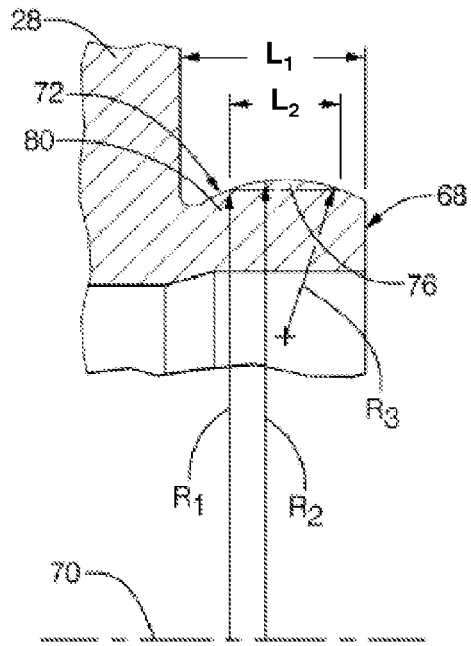

Referring to FIG. 5, the centering flange 68 is formed with a profiled outer surface 72 that enables the centering flange 68 to be slid into engagement with the cylindrical inner surface 64 of the shoulder 62 while the axes 66, 70 are misaligned (i.e., with the second CV joint member 28 of first rotating part 20 slightly cocked relative to the second rotating part 22, as shown in FIG. 15) without causing the second CV joint member 28 to bind at the centering flange 68 with the second rotating part 22 as one of a plurality of bolts is being tightened during a transition between a state of partial mounting or assembly wherein centering flange 68 and cylindrical inner surface 64 are interengaged and axes 66, 70 are misaligned, as shown in FIG. 15, and a state of more complete mounting or assembly wherein centering flange 68 and cylindrical inner surface 64 have a substantially interference fit and axes 66, 70 are aligned, as shown in FIG. 16. In one embodiment, shown in FIG. 5 for instance, the outer surface 72 of centering flange 68 is convexly curved in the axial direction in order to provide contact with the cylindrical inner surface 64 of the shoulder 62.

To better understand the fit between the centering flange 68 and the inner cylindrical surface 64 of the shoulder 62, the geometry and dimensioning of the centering flange 68 is now described. The centering flange 68 is disposed about the axis 70 of the second CV joint member 28 of the first rotating part 20 and has a first length $L_1$. The first length $L_1$ is considered the overall axial length of the centering flange 68 relative to the axis 70 of the second CV joint member 28.

The centering flange 68 has a contact section 76 configured for being in a substantially interference fit with the inner cylindrical surface 64 of the shoulder 62 of the mating flange 58 when mounting the centering flange 68 to the inner cylindrical surface 64. The contact section 76 has a second length $L_2$ substantially smaller than the first length $L_1$ of the centering flange 68 such that the substantially interference fit between the centering flange 68 and the inner cylindrical surface 64 provides alignment of the axes 66, 70 of the centering flange 68 and the second rotating part 22 while minimizing forces necessary to mount the centering flange 68 to the second rotating part 22.

In one embodiment, the term substantially smaller is further defined as the second length $L_2$ being less than 70 percent of the first length $L_1$. In a further embodiment, the term substantially smaller is further defined as the second length $L_2$ being less than 50 percent of the first length $L_1$. In yet another embodiment, the term substantially smaller is further defined as the second length $L_2$ being less than 30 percent of the first length $L_1$.

The centering flange 68 also includes at least one non-contact section 80 configured for not being in a substantially interference fit with the inner cylindrical surface 64 of the shoulder 62. The non-contact section 80 radially extends from the axis 70 of the second CV joint member 28 at a first maximum radius $R_1$ and the contact section 76 radially extends from the axis 70 at a second maximum radius $R_2$ greater than the first maximum radius $R_1$. As a result, the contact section 76 extends further radially outwardly than the non-contact section 80 to provide the substantially interference fit between the contact section 76 and the inner cylindrical surface 64.

The outer surface 72 may comprise any of a number of shapes in cross-sectional profile that will provide a contact section 76 for being in a substantially interference fit with the inner cylindrical surface 64 while minimizing the forces necessary to mount the centering flange 68 to the second rotating part 22 and accommodating misalignment during connection of the second CV joint member 28 of the first rotating part 20 with the second rotating part 22. In other words, various shapes of the outer surface 72 are contemplated by the present invention. Some of these shapes are shown in FIGS. 5-14. In FIGS. 6-14, the second length $L_2$ is respectively represented as $L_3$-$L_{11}$. Moreover, in the depicted embodiments the contact section reaches the second maximum radius $R_2$ only locally along its respective axial length $L_2$-$L_{11}$. Additionally, the numerals referring to like parts in FIGS. 6-14 have been respectively increased by increments of 100.

Figure 6:
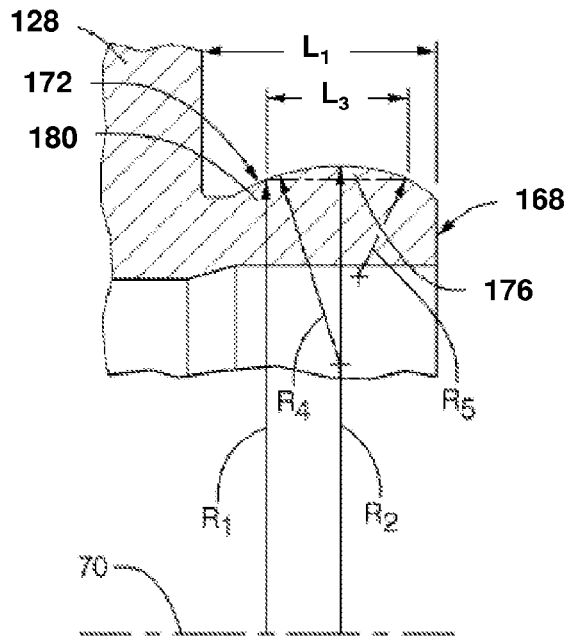
FIGS. 6-14 are enlarged, partial, cross-sectional views of various alternative embodiments of the centering flange of the joint assembly of the present invention.

In FIGS. 5 and 6, the outer surface 72, 172 is further defined as a curved surface. The curved surface 72 of FIG. 5 is formed at a single radius $R_3$, while the curved surface 172 of FIG. 6 is formed at multiple radii $R_4$, $R_5$.

Figure 7:
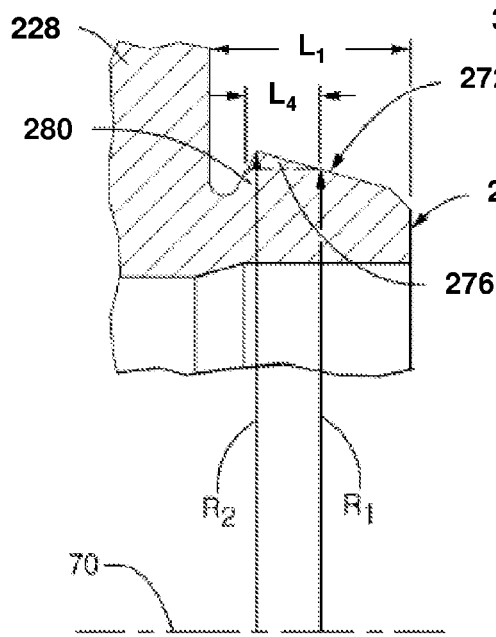
Figure 8:
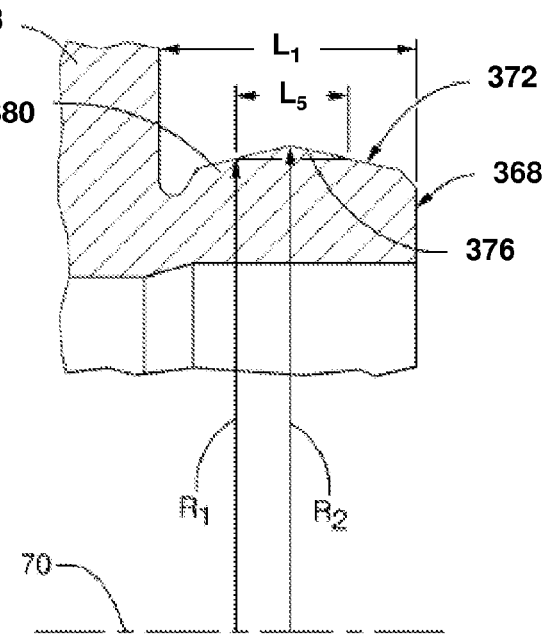

In FIGS. 7 and 8, the outer surface 272, 372 is further defined as a plurality of joined frustoconical surfaces. In FIG. 7, differing first and second frustoconical surfaces are arranged such that the bases of the first and second frustoconical surfaces are included in the contact section 276, while the second frustoconical surface also includes the non-contact section 280. In FIG. 8, the contact section 376 is partially defined at the intersection of two similar frustoconical surfaces.

Figure 9:
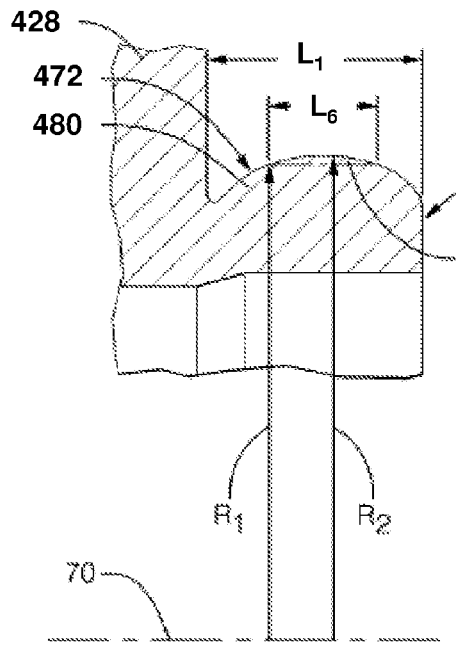

In FIG. 9, the outer surface 472 is further defined as a semi-elliptical surface.

Figure 10:
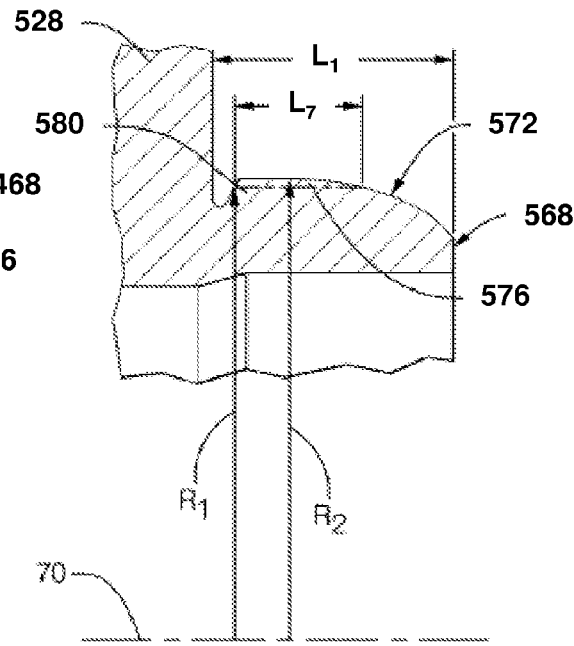

In FIG. 10, the outer surface 572 is further defined as a parabolic surface.

Figure 11:
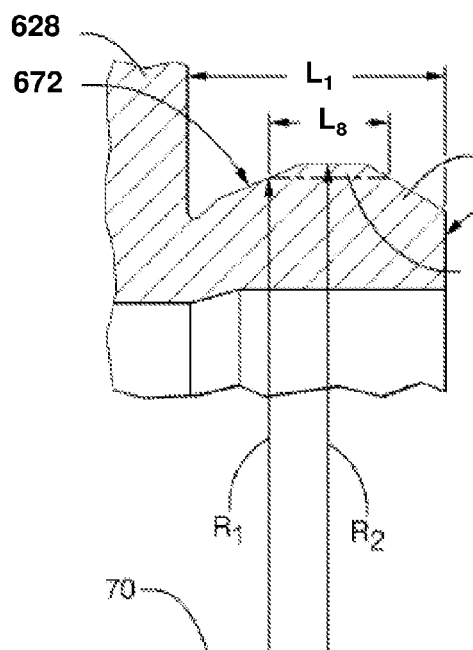

In FIG. 11, the outer surface 672 is further defined as a plurality of frustoconical surfaces joined by a cylindrical surface.

Figure 12:
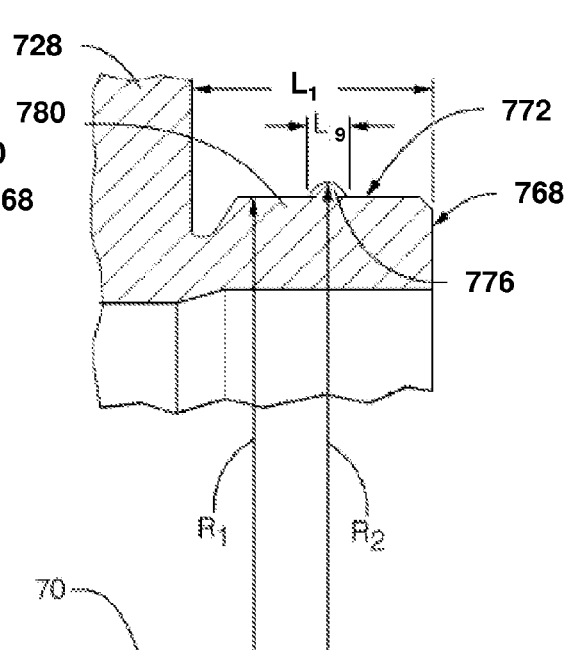

In FIG. 12, the outer surface 772 includes a projection or protrusion 78 extending radially outwardly relative to the axis 70 of the second joint member 728. The protrusion 78 includes the contact section 776, while the non-contact section 780 lies on both sides of the protrusion 78.

Figure 13:
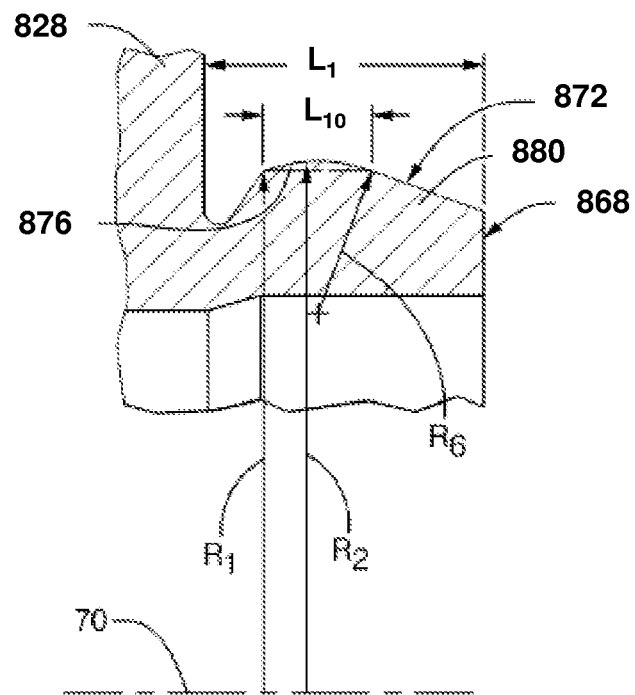

In FIG. 13, the outer surface 872 is further defined as a curved surface as in FIGS. 5 and 6, except that the curved surface is formed at a single radius $R_6$ with an offset. In this embodiment, the offset is in the non-contact section 880.

Figure 14:
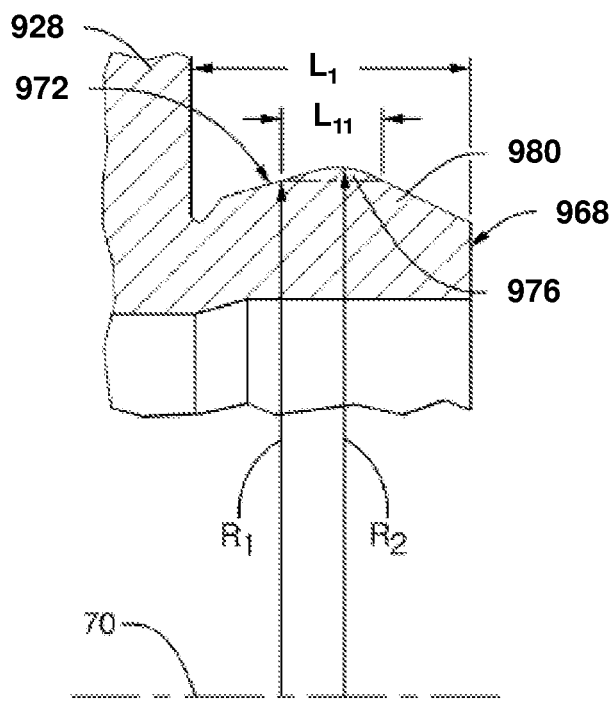

In FIG. 14, the outer surface 972 is further defined as a plurality of frustoconical surfaces joined by a curved surface.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

What is claimed is:

1. A joint assembly for coupling first and second rotating parts, comprising:

a first rotating part comprising a first mounting flange having a first shoulder, the first rotating part rotatable about a first longitudinal axis;

a second rotating part comprising a second mounting flange having a second shoulder, the second rotating part rotatable about a second longitudinal axis, the first flange and the second flange configured to secure the joint assembly with the first shoulder proximate the second shoulder;

a cylindrical inner surface disposed in the second shoulder and disposed about the second axis;

a centering flange disposed on the first shoulder, the centering flange having a first length and disposed about the first axis; the centering flange having an axially extending non-contact section and an axially coextending contact section that is disposed within and extends radially outwardly from the non-contact section, the contact section having an annular convexly curved outer surface disposed about the first axis and a second length substantially smaller than the first length, the contact section configured to provide a substantially interference fit within the inner surface and axial alignment of the first axis and the second axis;

the joint assembly having a first state in which the contact section of the centering flange and the inner surface are engaged and the first and second longitudinal axes are misaligned; and the joint assembly having a second state in which the contact section of the centering flange and the inner surface are engaged and the first and second longitudinal axes are substantially aligned, an interference fit existing when the joint assembly is in the first state and the second state.

2. The joint assembly of claim 1, wherein the second length is less than 70 percent of the first length.

3. The joint assembly of claim 1, wherein the second length is less than 50 percent of the first length.

4. The joint assembly of claim 1, wherein the second length is less than 30 percent of the first length.

5. The joint assembly of claim 1, wherein the convexly curved outer surface is formed from a single radius of curvature.

6. The joint assembly of claim 1, wherein the convexly curved outer surface is formed from a plurality of radii of curvature.

7. The joint assembly of claim 1, wherein the convexly curved outer surface comprises a semi-elliptical surface.

8. The joint assembly of claim 1, wherein the convexly curved outer surface comprises a parabolic surface.

9. The joint assembly of claim 1, wherein the non-contact section comprises a plurality of frustoconical surfaces joined by a cylindrical surface and the contact section comprises the convexly curved outer surface.

10. The joint assembly of claim 9, wherein the convexly curved outer surface comprises a protrusion extending radially outwardly from the cylindrical surface.

11. The joint assembly of claim 1, wherein the non-contact section comprises a plurality of frustoconical surfaces that extend outwardly to join the convexly curved outer surface.

12. The joint assembly of claim 11, wherein the convexly curved outer surface is formed from a single radius of curvature.

13. The joint assembly of claim 11, wherein the convexly curved outer surface is formed from a plurality of radii of curvature.

14. The joint assembly of claim 11, wherein the convexly curved outer surface is offset within the non-contact section.

15. A joint assembly for coupling first and second rotating parts, comprising:

a first mounting flange having a first shoulder and a centering flange disposed about a first longitudinal axis, the centering flange having a first length and a contact section extending radially outwardly relative to the first axis having an annular convexly curved outer surface disposed about the first axis and a second length substantially smaller than the first length;

a second mounting flange having a second shoulder and a second longitudinal axis and a cylindrical inner surface disposed within the second shoulder about the second longitudinal axis, the cylindrical inner surface defining a void in which the centering flange is received; the first flange and the second flange securing the joint assembly with the first shoulder disposed opposite the second shoulder;

the joint assembly having a first state in which the contact section of the centering flange and the inner surface are engaged and the first and second axes are misaligned; and the joint assembly having a second state in which the contact section of the centering flange and the inner surface are engaged and the first and second axes are substantially aligned, an interference fit existing when said joint assembly is in the first state and the second state, wherein a transition between the first state and second state is substantially devoid of binding between the first and second rotating parts.

16. The joint assembly of claim 15, wherein the convexly curved outer surface is formed from a single radius of curvature.

17. The joint assembly of claim 15, wherein the convexly curved outer surface is formed from a plurality of radii of curvature.

18. The joint assembly of claim 15, wherein the convexly curved outer surface comprises a semi-elliptical surface.

19. The joint assembly of claim 15, wherein the non-contact section comprises a plurality of frustoconical surfaces joined by a cylindrical surface and the contact section comprises the convexly curved outer surface.

20. The joint assembly of claim 19, wherein the convexly curved outer surface comprises a protrusion extending radially outwardly from the cylindrical surface.

* * * * *